Figure 1:
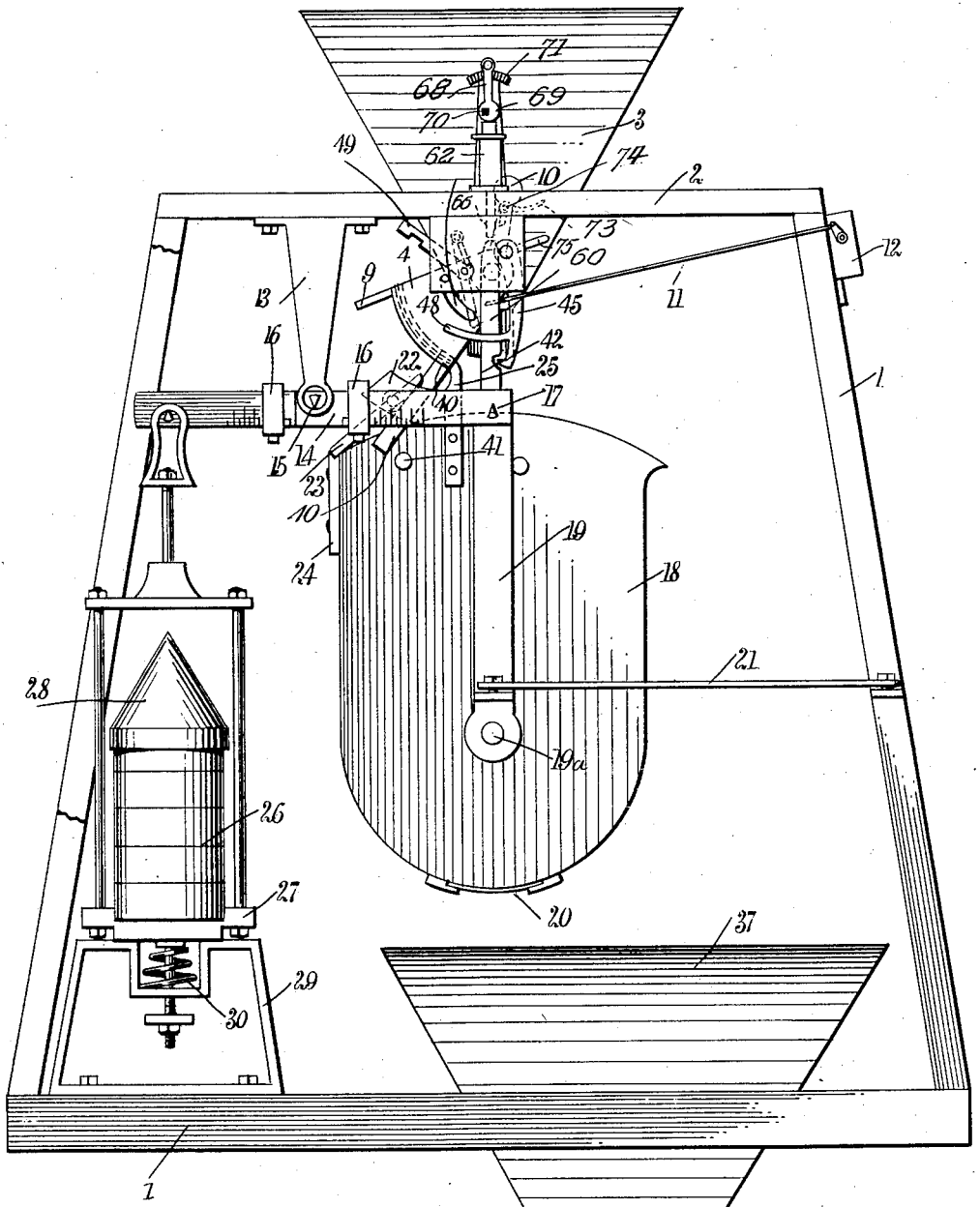

V. O. KLINGLER.
SCALE.
APPLICATION FILED JUNE 3, 1912.

1,091,349.

Patented Mar. 24, 1914.

3 SHEETS—SHEET 1.

WITNESSES

INVENTOR
Victor O. Klingler
BY
ATTORNEYS

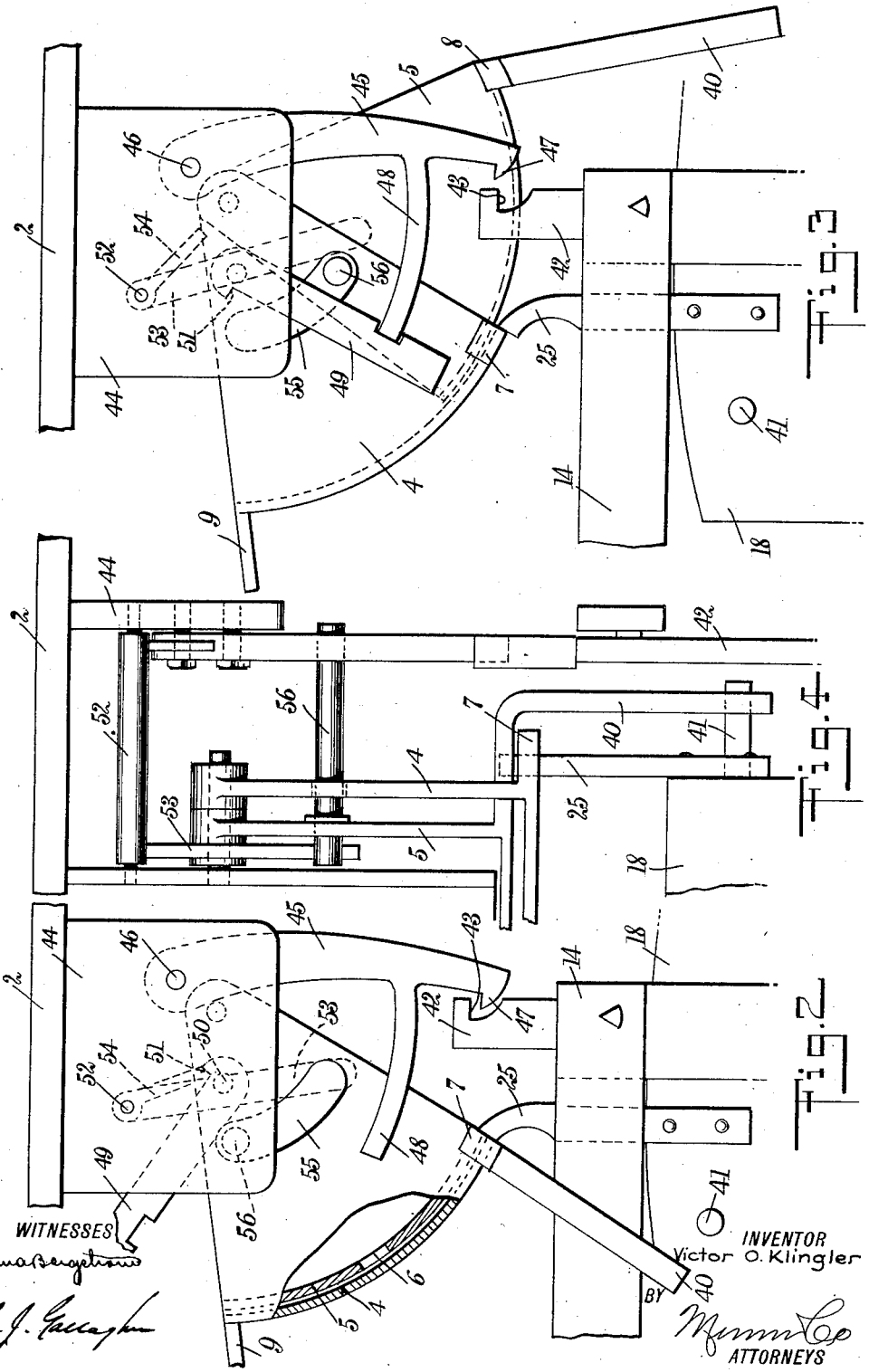

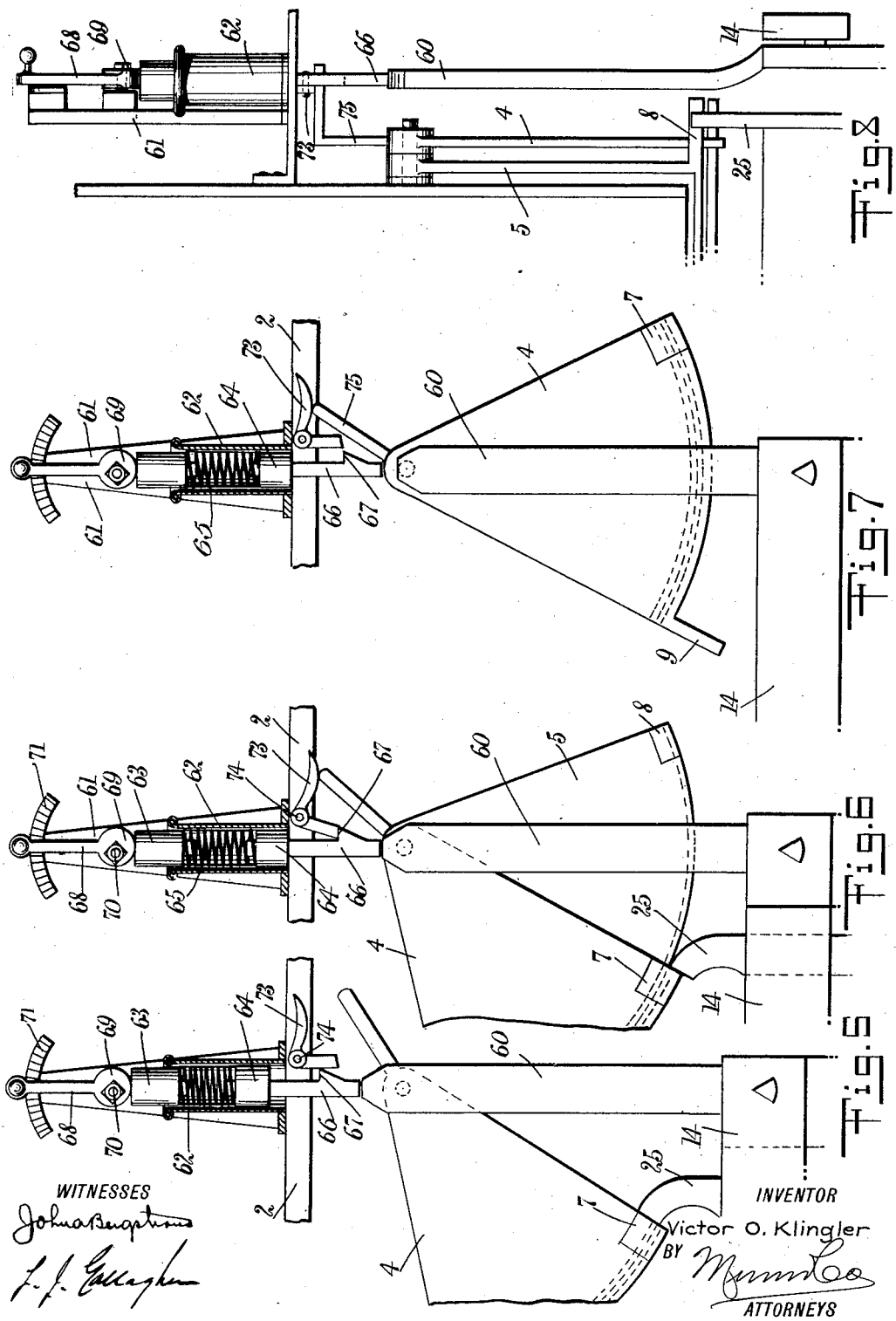

UNITED STATES PATENT OFFICE.

VICTOR O. KLINGLER, OF SLAYTON, MINNESOTA.

SCALE.

1,091,349.   Specification of Letters Patent.   Patented Mar. 24, 1914.

Application filed June 3, 1912.   Serial No. 701,218.

*To all whom it may concern:*

Be it known that I, VICTOR O. KLINGLER, a citizen of the United States, and a resident of Slayton, in the county of Murray and State of Minnesota, have invented a new and Improved Scale, of which the following is a full, clear, and exact description.

My invention relates generally to scales, and, more particularly, to beam scales for automatic weighing of large quantities of grain or the like, such as is described and claimed in Patent No. 1,015,190, granted to me January 16, 1912.

The principal object of my invention is to provide a new and useful improvement especially adapted for use with the above-described scales, whereby the valves will operate more easily, the use of the improvements also tending to save the wear on certain of the coöperating parts.

A further object of my invention is to provide a new and improved mechanism for controlling the dribble stream and steadying the scale beam when the scale is worked at full capacity.

A still further object of my invention is to provide a new and improved structure, whereby the scale beam is rendered substantially stable during the operation of weighing, whereby the actual capacity of the scale in use is increased and the operation rendered more efficient.

Other objects and advantages of the invention, not particularly set forth at this time, will appear as the description thereof proceeds, it being noted that the parts set forth and described in the drawings are merely typical and illustrative of what may be used to accomplish the purpose of the invention, such parts being capable of various changes in design and relation among themselves.

Reference is to be had to the accompanying drawings, forming part of this specification, in which similar characters of reference denote corresponding parts in all the views, and in which—

Figure 1 is a side view of the scales in operative position ready for weighing; Fig. 2 is a partial side view thereof showing the mechanism whereby the scale beam is steadied when the upper valve closes; Fig. 3 is a similar view showing one of the valves closed; Fig. 4 is an end view of the parts as shown in Fig. 3; Fig. 5 is a side view of the improved mechanism for regulating the period of the dribble stream and effectually choking the rebound of the scale beam; Fig. 6 is a similar view showing one of the valves closed; Fig. 7 is a similar view showing both valves closed; while Fig. 8 is a partial end view of the structure shown in Figs. 5, 6, and 7, in coöperative relation with the bucket.

Any suitable frame 1 is provided with cross bars 2 on which is mounted a hopper 3, the lower open end of the hopper being adapted to be closed by valves 4, 5, the valve 5 being preferably provided with an opening 6, while the valve 4 is preferably solid; these valves 4, 5, are provided with stops or lugs 7, 8, the valve 4 being also provided with an offset arm 9, and a counterpoise 10. The rod 11 is pivotally engaged with the valve 4 and actuates a suitable tally 12 on the frame 1. Secured to the cross bars 2 of the frame 1, and depending therefrom, are bearings 13 of any suitable form of construction, a scale beam 14 being carried by the bearings on knife edges 15.

Movably mounted on the scale beam 14 are the poises 16, whereby the desired balance may be obtained; movably mounted on the end of the scale beam 14 on a knife edge 17 is a bucket 18 suspended in suitable bearing members 19, any desirable form of pivotal mounting 19ª being provided, whereby the bucket may be easily tilted; it is to be noted that the bucket 18 is preferably weighted at its bottom by means of a suitable mass of material 20, whereby the bucket tends to maintain an upright position, as shown in Fig. 1, when empty. Extending from the frame 1 to the bucket bar, or bearing member 19, is a rod 21, whereby the member 19 is prevented from swaying when the bucket is tilted.

On the scale beam 14 is an extended frame or hanger 22 and pivotally mounted thereon is a locking bar 23 adapted to normally engage a notched bar 24 on the bucket 18, whereby the bucket when empty is held in an upright position; on the sides of the bucket 18 are upwardly projecting bars or fingers 25 adapted to engage the before-mentioned lugs 7, 8, to hold open the valves 4 and 5. On the opposite end of the scale beam 14 is a counter-balance 26 mounted in any suitable frame 27, preferably provided with a hood 28 in order to protect the said part.

Below the bucket and adapted to receive the material therefrom when the same is emptied is a bin opening or hopper 37, the size of which will depend on the size of the bucket 18 and the amount of material carried thereby.

The above structure is substantially similar to that shown in Letters Patent already granted to me, above-identified, which patent sets forth the manner of using such scales. I will proceed to set forth the new and improved features which distinguish the present mechanism over that described and claimed in the said patent.

The inner valve 5 is provided with a downward extension 40 and on the side of the bucket 18 is a pin 41 adapted to be engaged by the said extension 40 when the valves 4 and 5 are being opened by the return of the bucket after emptying.

Due to this construction, the valves will open very much easier due to the increased leverage, the construction also providing for less wear on the lugs 7, 8, carried by the valves and adapted to be engaged by finger bar 25 on the bucket.

The extension 40 and the pin or lug 41 are so arranged that, when the valves are forced wide open, the extension 40 leaves the pin or lug 41 when the finger 25 engages the lugs 7, 8, on the valves, whereby they are maintained in the position shown particularly in Figs. 1 and 2.

I have found when using the structure described and claimed in the Letters Patent granted to me, above-identified, that the spring shown in that patent, for controlling the dribble stream must have substantial tension in order to close the upper valve 5 five or six seconds before full weight is obtained in the bucket, the balance of the grain or material being weighed, necessary to make full weight, entering the bucket through the dribble hole 6 in the said inner valve 5; such method decreases the capacity of the scale and increases the liability of clogging the dribble hole when the grain or other material being weighed happens to be dirty. If the spring employed in the patented device is of small tension so that the upper valve remains open until nearly full weight is obtained in the bucket, then the scale beam 14, immediately on closing the upper valve 5, becomes unstable, either dropping so far as to release both valves at once, or rebounding when the upper valve cuts off the stream of grain or other material which has been entering the bucket. The structure of the present invention is designed to avoid these objections and the spring employed in the patented device, is done away with.

The structure about to be described momentarily stops the downward swing of the scale beam when the upper valve 5 is closed. Secured to the bucket hanger or end of scale beam 14 and extending upwardly therefrom is an extension 42 having a notch 43 therein; carried by the main frame 2 in any suitable form of hanger or plate 44 is a latch 45 pivotally connected to the said plate at 46 and provided adjacent its lower end with a hook 47 and an extension or lateral projection 48. On this same plate 44 is a hammer 49 pivotally mounted in position at 50 and having a recess or notch 51 therein. Movably mounted in position with respect to the plate 44 and preferably on a shaft 52 are the arm 53 and detent 54; the valve 4 is provided with a slot 55 into which a lug 56 extends, which lug is carried by the upper valve 5. When both valves are open, the relative position of the parts described is as shown in Figs. 1 and 2. The hook 47 is ready to engage the notch 43 in the extension 42 carried by the scale beam when the beam drops sufficiently so that the finger 25 carried by the bucket moves out of engagement with the lug 8 on the upper valve 5; the hook remains in engagement with the notch until the hammer 49 descends and strikes the lateral extension or projection 48 on the latch 45, which does not take place until a moment after the upper valve 5 is entirely closed (as described) since the pin or projection 56, when the lever 53, which is nearly closed, strikes the lever 53, which turns the shaft 52 and disengages the detent 54 from the recess or notch 51 in the hammer 49; the pin or offset 56 also serves to raise the hammer 49 when the valves are being opened, as will be understood from the drawings. It is necessary that a short space of time, substantially a moment or so, elapse between the closing of the valve 5 and the disengagement of the latch 45, or, rather, the hook on this latch from the notch 43 carried in the extension 42 on the scale beam, in order to have the desired effect, and this is accomplished by the arrangement of the parts as shown.

It is, of course, understood that it is the amount of grain in the bucket 18 plus the pressure of the spring 65 (shown in Fig. 5, and to be more particularly set forth presently) which causes the first downward movement of the bucket, the balance of the movement being due to the grain alone; the projecting finger 25 carried by the bucket at the upper portion thereof coming out of engagement with the lug 8 on the inner or upper valve 5 after certain movement of the bucket permits the valve 5 to come to the position shown in Fig. 3 as described; as the grain dribbles into the bucket, the bucket continues its downward movement a sufficient distance and this same finger 25 on the bucket comes out of engagement with the lug 7 on the outer or lower valve 4, permitting the same to come to closed position, this movement being unobstructed otherwise by any of the parts shown and described. As the bucket turns within its bearings 19ᵃ it gradually comes to dumping position, whereby the grain or other material being weighed is deposited in the outlet or chute 37, the bucket returning to normal position after such dumping, due to the counterpoise or mass of material 20 at the bottom thereof. On the return movement of the bucket, the projecting pin 41 engages the extension 40 on the valve 5, and the valve 5, together with the valve 4 (which lies outside of the valve 5) are brought to normal position, as shown in Fig. 2, it being noted that after a portion of the travel the pin 41 leaves the extension 40, the final return movement of the valve being effected by the engagement of the finger 25 carried by the bucket with the lugs 7, 8, on the valves.

The laterally extending projection 56 on the inner valve 5 moves through the recess or slot 55 in the outer valve 4 and on the return movement of the valves this projection comes into engagement with the hammer 49 bringing it into position shown in Fig. 2 with the detent 54 in engagement with the notch 51 in the said hammer 49; the latch 45 with the hook 47 thereon thus hangs freely and is brought adjacent to but out of engagement with the notch 43 in the extension 42 carried by the scale beam 14.

The purpose, then, and the method of operation of the parts prevents the undue downward movement of the bucket 18 after the valve 5 comes to closed position by reason of the engagement of the hook 47 in the notch 43, which engagement is momentary and merely sufficient to control the scale beam 14 or make it as steady as possible while the weight of material within the bucket is being brought to the determined amount by means of the dribble stream through the hole 6; that this engagement is momentary is seen from the operation of the valves; the laterally projecting pin 56 (carried by the valve 5 which closes first) in its travel, engages arm 53 on the shaft 52, thereby moving the detent 54 on this shaft out of engagement with the notch 51 in the hammer 49, after which release this hammer strikes the end of the projection 48 on the latch 45, whereby the hook 47 is brought out of engagement with the notch 43; this operation of the parts involves a substantial length of time, which is the result desired.

Referring particularly to Figs. 5 to 8 inclusive, it will be noted that I have therein set forth a new and improved means especially adapted for regulating the length of the dribble stream and effectually choking the rebound of the scale beam in the opposite direction to that just mentioned. In the structure described and claimed in Letters Patent No. 1,015,190, granted to me, if the tension of the spring which brings about the dribble is sufficiently great to set up the desired dribble when weighing wheat and other heavy grains, such tension will cause an unduly long dribble when weighing lighter grains. I have, therefore, found it desirable to provide, in place of the spring of the patented device, an arrangement whereby the length of the dribble may be adjusted independently and whenever desired, the spring 30 being done away with.

Referring particularly to Figs. 5 to 8, it will be noted that the side bar of the bucket hanger is provided with an upward extension 60; secured to the end portion 2 of the main scale frame is a suitable bracket or support 61 on which is mounted a cylinder 62, which carries movable plungers 63, 64, there being a spring 65 between them and contained within the tube or cylinder. The plunger 64 has a downwardly extending arm 66, on one side of which is hook 67. To this bracket or support 61 is pivotally secured the lever 68, the lower end portion 69 of which is enlarged and provided with an offset opening through which the pin 70 extends, which pin serves as the pivotal mounting of the lever, the result being that the enlarged end 69 forms, in effect, a cam. The bracket or support 61 is also provided with an arcuate plate 71, the surface of which is preferably corrugated, into any one of the corrugations of which the said lever 68 is adapted to be entered and be held in such position, whereby the cam 69 will vary the pressure on the plungers 63, 64. When the scale beam 14 descends sufficiently to disengage the arm 25 from the lug 8 on the valve 5, the bell crank lever 73, pivotally mounted at 74 on a portion of the main frame, will engage with the hook 67 carried by the arm 66, thereby effectively stopping the rebounding of the scale beam. It will be particularly noted that the valve 4 is provided with the arm 75 so that, when the valve closes this arm comes into engagement with the bell crank lever 73, disengaging the same and moving it away from the hook 67, as shown particularly in Fig. 7.

The provision of the plungers 63 and 64 with the spring 62 between them, the tension of the spring being adjusted by means of the lever 68, is especially adapted for use on automatic scales with which heavy grains and light grains are weighed. As previously stated, the particular purpose of the spring and the plungers and the engagement of them with the bell crank 73 operated through the medium of the arm 75 carried by one of the valves is to prevent the rebound of the scale beam when one of the valves closes, that is, when the bucket is almost full; these parts have the further purpose of providing means for regulating the duration of the dribble through variation in the tension of the spring by means of the lever 68.

The operation is as follows: Assuming that this is a scale of one hundred lbs. bucket capacity, and that the spring 65 exerts a pressure of ten pounds on plunger 64, then in such case after ninety pounds of grain or other material has run into the bucket, the latter will start to descend until the plunger 64 strikes the bottom of tube 62. When this occurs, the notch 43 on the extension 42 will just about touch the hook 47 of latch 45 momentarily checking a further downward swing of the scale beam 14. At the same time the lever 73 will engage the hook 67 on the arm 66 of the plunger 64 thus preventing a rebound of the scale beam. The bucket having descended as above described, the finger 25 fastened on the bucket has moved downward and away from the lug 8 of the valve 5 allowing this valve to close. It is the sudden closing of this valve, shutting off all but a very small stream of grain going into the bucket that gives the scale beam an unstable tendency, which however is effectually checked by the means above described. The projecting pin 56 fastened on the upper valve 5 strikes the arm 53 when the valve 5 is nearly closed. This arm 53 being fastened on shaft 52, on which shaft is also fastened the detent 54, disengages said detent 54 from notch 51 of hammer 49, permitting hammer 49 to drop. The hammer 49 in its downward swing strikes the projection 48 of latch 45 disengaging the hook 47 from the notch 43 thus allowing the scale beam to descend farther as soon as the weight of grain in the bucket has reached one hundred pounds. The hook 47 remains engaged with the notch 43 but a moment, or just long enough to check the swing of the scale beam. These means of checking the vibrating tendency of the scale beam enables the scale to work with great accuracy and speed, as a much shorter dribble stream can be used. When the full one hundred pounds of grain has entered the bucket the same descends farther carrying with it the finger 25 which releases the lug 7 of the valve 4 which closes, shutting off entirely the stream of grain to the bucket. When the valve 4 closes the arm 75 on its upper end strikes the lever 73 disengaging the same from the hook 67, thus permitting the scale beam to rise again when the bucket is emptied. The lever 68 being fastened eccentrically at 70 the tension of the spring 65 and with it the duration of the dribble stream can be changed at will.

From the above description taken in connection with the accompanying drawings, it will appear that the automatic scales, equipped with the improvements herein described, offer an improved structure in this art and one adapted to a wider field of use; of course, the particular size and proportion of the parts shown is simply to set forth the invention idea, various changes in such features being contemplated within the scope of the appended claims.

Having thus described my invention, I claim as new, and desire to secure by Letters Patent:—

1. The combination of a bucket adapted to receive grain or other material, a plurality of concentric valves adapted to control the supply of grain or other material to the bucket, means whereby the valves may be held in one position to permit the bucket to be filled, movement of the bucket when nearly filled bringing about a disengagement of the said means, whereby one of the valves closes, and means for engaging the bucket structure to steady the bucket when the said valve closes, the said means being adapted to be actuated by the movement of the said valve in closing to move the same out of engagement with the bucket structure.

2. The combination of a bucket and a movable scale beam, the bucket being movably mounted on the scale beam, concentric valves for controlling the supply of material to the bucket, means carried by the bucket for holding the valves in one position, whereby material may enter the bucket, said means moving away from one of the valves whereby it closes when the bucket is nearly full, a movable member coöperating with the said bucket in order to prevent undue movement thereof when the first valve closes, and other means actuated by the said valve in closing for bringing the said means out of such coöperative relation after the valve has closed.

3. The combination of a bucket adapted to receive material to be weighed, a plurality of concentric valves controlling the supply of material to the bucket, whereby the material entering the bucket is controlled, means carried by the bucket and engaging the valves, whereby they are held in open position, one of the valves being adapted to permit a dribble stream to enter the bucket when the said valve is closed, means to prevent movement of the bucket beyond that necessary to permit the first valve to close, and other means actuated by the closing of the said valve to bring the first means to inoperative position, whereby movement of the bucket is again permitted with the dribble stream entering therein.

4. The combination of a bucket and a scale beam, the bucket being movably suspended on the beam, a plurality of valves for controlling the supply of material to the bucket, means on the bucket for holding the said valves open, movement of the bucket carrying the said means out of engagement with one of the valves, whereby it may close, the said valve having an opening therein to permit a dribble stream to enter the bucket, means for preventing further movement of the bucket during closing of the said valve, and other means actuated by movement of the said valve in closing and bringing the first means to inoperative position after the said valve has closed, whereby the dribble stream into the bucket will move the bucket when the desired amount has been received, the second valve closing subsequently.

5. The combination of a bucket and a movable scale beam, the beam carrying the bucket concentric valves for controlling the supply of material to the bucket, means carried by the bucket in engagement with the valves for maintaining them in open position, the bucket moving after a certain amount of material has been received therein, whereby one of the valves closes, the said valve permitting a dribble stream to enter the bucket after such closing, a latch for engagement with the bucket structure for preventing further movement thereof after such initial movement permitting the said valve to close, means actuated by the said valve as it closes for bringing the latch to inoperative position, whereby as the dribble stream enters the bucket, movement of the bucket is permitted, the second valve closing after the bucket has received the requisite amount of material.

6. The combination of a movable scale beam and a bucket, the bucket being movably mounted on the beam, concentric valves for controlling the supply of material to the bucket, means on the bucket engaging the valves for keeping them in open position, movement of the bucket after a certain amount of material has been received carrying the said means out of engagement with one of the valves, whereby it will close, the said valve permitting a dribble stream to enter the bucket, a latch for engaging the bucket structure for preventing further movement thereof during closing of the said valve, the said valve being provided with an offset, and means actuated by engagement with the said offset to carry the latch to inoperative position, whereby, as the dribble stream enters the bucket, the bucket may move, further movement of the bucket carrying the means thereon out of engagement with the second valve, whereby the same closes and the supply of material to the bucket is cut off.

7. The combination of a scale beam and a bucket movably mounted thereon, a plurality of concentric valves for controlling the supply of material to the bucket, means carried by the bucket in engagement with the valves for maintaining them in open position, the said bucket being movable to different successive positions, whereby the valves may successively close, a latch engaging the bucket structure for preventing movement thereof after it has moved a distance sufficient to close the first valve, the said valve permitting a dribble stream to enter the bucket, a pin carried by the first valve, a detent actuated by the pin as the first valve comes to closed position, and means for disengaging the latch, thereby permitting movement of the bucket due to the material received from the dribble stream, final movement of the bucket closing the second valve.

8. The combination of a movable scale beam and a bucket movably mounted thereon, a plurality of valves for controlling the supply of material to the bucket, means carried by the bucket for maintaining the valves in open position, the bucket being capable of successive movements in order to permit the valves to close successively, a latch for preventing movement of the bucket after such first movement, whereby the first valve is permitted to close, the said first valve when closed permitting a dribble stream to enter the bucket, a pin carried by the first valve, a hammer, a detent for holding the hammer in one position, the engagement of the pin with the detent structure bringing the hammer to a second position and releasing the latch, whereby movement of the bucket under the influence of the dribble stream is permitted, further movement of the bucket causing the second valve to close, whereby the supply of material to the bucket is stopped.

9. The combination of a scale beam and a bucket movably mounted thereon, a plurality of valves for controlling the supply of material to the bucket, means carried by the bucket for keeping the valves in open position, whereby material may enter the bucket, the bucket being capable of successive movements due to the weight of material received therein, a latch movably mounted in position for preventing movement of the bucket beyond that necessary to carry the bucket to such position that the first valve may close, the said valve permitting a dribble stream to enter the bucket, a pin on the first valve, a hammer having a notch therein movably mounted in position, a shaft having an arm and a detent thereon, the said detent engaging the said notch, the said pin being adapted to engage the arm carried by the said shaft, whereby the detent is brought out of engagement with the said notch in the hammer, the said hammer being thereby permitted to move and to carry the movably mounted latch from operating position, thereby permitting further movement of the bucket under the influence of the dribble stream, the said movement of the bucket continuing until the second valve closes, whereby the supply of material is stopped.

10. The combination of a bucket having a pin thereon, the bucket being pivotally mounted in position, a plurality of concentric valves for controlling the supply of material to the bucket, means carried by one of the valves and adapted to be engaged by the pin on the bucket as the bucket moves, whereby the valves are brought to open position, and other means carried by the bucket for engagement with the valves to maintain them in such open position.

11. The combination of a bucket having a laterally extending pin thereon, the bucket being pivotally mounted in position, a plurality of concentric valves for controlling the supply of material to the bucket, an extension carried by one of the valves and adapted to be engaged by the said laterally extending pin as the bucket is moved to normal position, whereby the valves are opened, and a finger carried by the bucket for engagement with the valves for maintaining them in open position.

12. The combination of a bucket, with a number of valves for controlling the supply of material to the bucket, the bucket moving under the weight of the said material received therein, whereby the valves are adapted to successively close, and means for preventing a rebound of the bucket after closing of the first valve, comprising a resiliently mounted plug adapted to be engaged by an element moving with the said bucket, the said resilient element taking up the rebound.

13. The combination of a bucket adapted to receive material to be weighed, a plurality of valves for controlling the supply of material to the bucket, the bucket being adapted to move to successive positions as material is received therein, whereby the valves are successively closed, resilient means adapted to be engaged by the moving structure after the first valve closes, whereby the said structure is steadied, and means adapted to be actuated by the closing of the second valve for permitting free movement of the said structure relatively to the said resilient means.

14. The combination of a bucket adapted to receive material to be weighed with a plurality of valves for controlling the supply of material to the bucket, the bucket being capable of successive movements as material is received therein, whereby the valves come successively to closed position, resilient means in engagement with the bucket structure as the same is being filled, whereby the movement of the bucket during the closing of the first valve is steadied and rebound prevented, the said means comprising a plug actuated by a spring, there being means for controlling the pressure of the said spring.

15. The combination of a bucket adapted to receive material to be weighed, the said bucket being movably mounted in position so that it may move to different successive positions due to the material received therein, a plurality of concentric valves adapted to be successively closed by such successive movements of the bucket, resilient means engaging the bucket structure, whereby the same is steadied during filling of the bucket, means for engagement with the said resilient means, after one of the valves is closed, for preventing rebound of the said structure, and other means operating upon the closing of the second valve for releasing the said engaging means.

16. The combination of a bucket adapted to receive material to be weighed, the bucket being adapted to move to successive positions as the necessary amount of material to be contained therein is approached, a plurality of concentric valves for controlling the material entering the bucket, means carried by the bucket for maintaining the valves in open position, a resiliently mounted plug engaging the bucket structure for steadying the same, a pivoted lever for engagement with the plug after the bucket has moved a distance sufficient to permit the first valve to close, whereby rebound of the structure is prevented, and other means carried by the second valve for carrying the said lever out of engagement with the said plug, whereby movement of the plug is permitted.

17. The herein described mechanism for preventing rebound of the bucket structure in automatic scales, comprising a resiliently mounted plug for engagement with the bucket structure, movement of the structure due to the weight of the material carried thereby being permitted, means for engagement with the said plug for preventing rebound of the bucket structure, other means for engagement with the said means, whereby the engagement with the plug is broken, movement of the plug being thereby permitted, together with a device for varying the pressure on the said resilient plug.

18. In combination with a bucket and a valve for controlling the supply of material thereto, the herein described means for preventing undue movement of the bucket, comprising a notched extension carried by the bucket structure, a latch adjacent the extension and coming into engagement therewith after the bucket has moved a certain distance due to the mass of material received therein, and means actuated by the closing of the valve for disengaging the latch and the said extension, whereby further movement of the bucket is permitted.

19. In combination with a bucket and a plurality of movable valves controlling the supply of material thereto, the herein described means for preventing undue movement of the bucket, comprising an extension carried by the bucket structure, a latch adjacent thereto, the extension and the latch coming into engagement when the bucket moves downwardly a certain distance and when one of the valves closes, and a hammer actuated by the closing of the said valve for disengaging the latch and the said extension.

20. In combination with a bucket and a plurality of valves for controlling the supply of material thereto, the herein described means for preventing undue movement of the bucket, comprising a notched extension carried by the bucket structure, a latch for engagement therewith, the latch and the extension coming into engagement when the bucket moves due to the mass of material received therein and when one of the said valves closes, a hammer, a detent maintaining the hammer in one position, and means for bringing the hammer to a second position, said means being actuated by the closing of the said valve, whereby the latch and the said extension are disengaged and further movement of the bucket is permitted.

In testimony whereof I have signed my name to this specification in the presence of two subscribing witnesses.

VICTOR O. KLINGLER.

Witnesses:
JOHN A. FRISVOLD,
OLE O. HOLMEN.